(12) United States Patent
Reynolds et al.

(10) Patent No.: US 11,135,989 B2
(45) Date of Patent: Oct. 5, 2021

(54) VEHICLE SECURITY DIVIDER

(71) Applicants: William A. Reynolds, Nixa, MO (US); Amy K. Reynolds, Nixa, MO (US)

(72) Inventors: William A. Reynolds, Nixa, MO (US); Amy K. Reynolds, Nixa, MO (US)

( * ) Notice: Subject to any disclaimer, the term of this patent is extended or adjusted under 35 U.S.C. 154(b) by 339 days.

(21) Appl. No.: 16/398,152

(22) Filed: Apr. 29, 2019

(65) Prior Publication Data

US 2020/0031303 A1  Jan. 30, 2020

Related U.S. Application Data

(60) Provisional application No. 62/712,059, filed on Jul. 30, 2018.

(51) Int. Cl.
  B60R 21/02 (2006.01)
  B60R 21/12 (2006.01)

(52) U.S. Cl.
  CPC ............ B60R 21/12 (2013.01); *B60R 21/026* (2013.01)

(58) Field of Classification Search
  CPC ........ B60R 7/04; B60R 21/026; B60R 21/06; B60R 21/11; B60R 21/12; B60R 21/16; B60R 2021/0266; B60N 3/00
  USPC ........... 296/24.4, 24.41, 24.42, 24.43, 24.44, 296/24.45, 24.46; 119/496; 280/749
  See application file for complete search history.

(56) References Cited

U.S. PATENT DOCUMENTS

| 1,611,248 | A | * | 12/1926 | Smith | B62D 31/00 296/24.46 |
| 2,219,412 | A | * | 10/1940 | Dean | B60R 21/12 296/24.42 |
| 3,549,195 | A | | 12/1970 | Kallinikos | |
| 3,652,120 | A | * | 3/1972 | Bernbach | B60N 2/2854 296/24.4 |
| 4,227,735 | A | | 10/1980 | Joyner | |
| 4,509,788 | A | * | 4/1985 | Jan | B60R 21/12 280/749 |
| 4,546,728 | A | * | 10/1985 | May | A01K 1/0272 119/496 |
| 4,595,227 | A | * | 6/1986 | Setina | B60R 21/12 296/24.46 |

(Continued)

FOREIGN PATENT DOCUMENTS

| DE | 4239471 A1 | * | 5/1994 | ............ B60R 21/06 |
| DE | 29509653 U1 | * | 10/1995 | .......... B60R 21/026 |
| FR | 2944499 A3 | | 10/2010 | |

OTHER PUBLICATIONS

"E/Z Rider 1/3 Prisoner, 2/3rds K9 Unit," American Aluminum Accessories, Inc. https://policecages.com/content/, Copyright 2018.

*Primary Examiner* — Joshua E Rodden
(74) *Attorney, Agent, or Firm* — Nath, Goldberg & Meyer; Richard C. Litman

(57) ABSTRACT

The vehicle security divider can be installed in a back seat compartment of a vehicle to provide a confinement area in a portion of the back seat compartment for confining a passenger therein. The divider includes a front panel, a back panel, and a side panel. The side panel extends orthogonally to the front panel and the back panel. The divider includes brackets that are designed to secure the divider to anchoring points already present in a vehicle. Windows can be provided on or more of the panels to allow observation of the confined passenger.

12 Claims, 4 Drawing Sheets

(56) References Cited

U.S. PATENT DOCUMENTS

| | | | | |
|---|---|---|---|---|
| 5,511,842 A * | 4/1996 | Dillon | ............ | B60N 2/24 |
| | | | | 224/400 |
| 5,848,817 A * | 12/1998 | Niehaus | ............ | B60R 21/026 |
| | | | | 296/24.46 |
| 6,250,700 B1 * | 6/2001 | Traxler | ............ | B60N 2/24 |
| | | | | 160/135 |
| 6,502,859 B1 * | 1/2003 | Svetlik | ............ | B60R 21/06 |
| | | | | 280/748 |
| 6,669,259 B2 * | 12/2003 | Murray | ............ | B60R 7/14 |
| | | | | 296/24.46 |
| 6,827,382 B2 | 12/2004 | Murray et al. | | |
| 6,978,736 B2 * | 12/2005 | Sanford | ............ | A01K 1/0272 |
| | | | | 119/496 |
| 2002/0180229 A1 | 12/2002 | Wheat | | |
| 2020/0031303 A1 * | 1/2020 | Reynolds | ............ | B60R 21/12 |

* cited by examiner

VEHICLE SECURITY DIVIDER

CROSS-REFERENCE TO RELATED APPLICATION

This application claims the benefit of U.S. Provisional Patent Application Ser. No. 62/712,059, filed Jul. 30, 2018.

BACKGROUND

1. Field

The disclosure of the present patent application relates to partitions for vehicle interiors and particularly to a vehicle security divider that confines a passenger to a designated area in the back seat compartment of a vehicle.

2. Description of the Related Art

Vehicle partitions are commonly employed to separate the front and rear seat compartments of police cars, taxi cabs, and other types of vehicles to prevent access to the front seat by a rear seat occupant. Vehicle dividers are also used for animal transportation. Typically, these partitions include a dividing wall positioned behind both of the front seats of the vehicle that forms a barrier between the front seat occupants and the rear seat occupants.

Many conventional dividers are permanently installed in vehicles when needed. These devices are difficult to install and typically require permanent modifications to the vehicle, which prevents a transition back to the original setup when there is no longer a need to contain a passenger.

With regard to police vehicles, storage area available in the front seats was traditionally adequate. For modern police equipment, e.g., radar and video equipment, used by police in recent times, the front seat storage area is insufficient.

Thus, a vehicle security divider solving the aforementioned problems is desired.

SUMMARY

The vehicle security divider can be installed in a back seat compartment of a vehicle to provide a confinement area in a portion of the back seat compartment for confining a passenger therein, while leaving a remaining portion of the compartment free for use as a storage area or for other passengers. The security divider is defined by a front panel, a side panel connected to the front panel, and a back panel connected to the side panel. The side panel extends orthogonally to the front and rear panels. The divider includes brackets which can be secured to anchoring points already present in a vehicle. One or more of the panels can include a window, e.g., a perforated or transparent portion, so an operator of the vehicle can observe the confined passenger.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
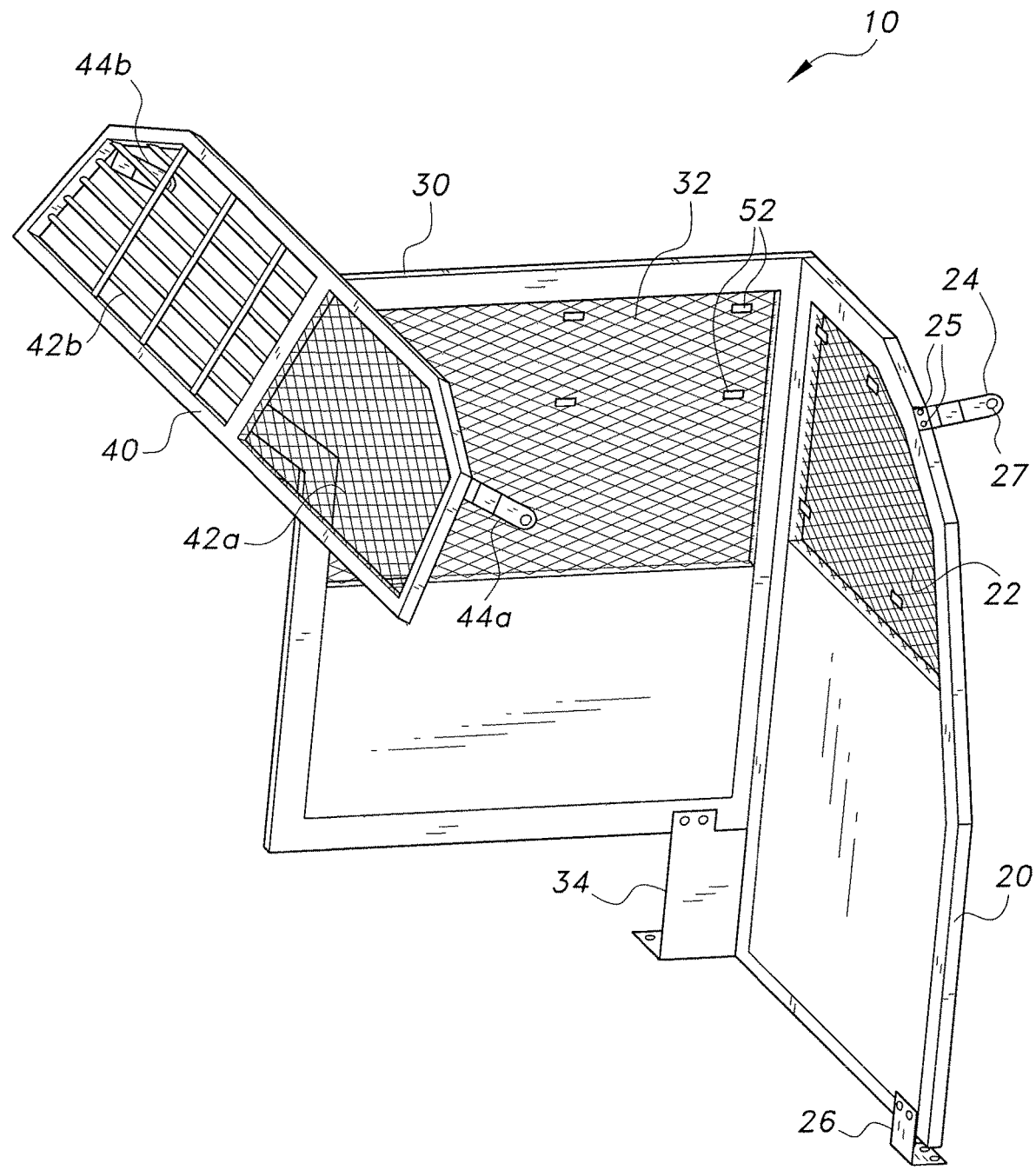
FIG. 1 is perspective view of an assembled vehicle security divider.

FIG. 1 shows an embodiment of the vehicle security divider 10 for a back seat compartment of a vehicle. The divider 10 includes a front panel 20, a side panel 30, and a rear panel 40. The front panel 20 can be positioned immediately behind the front seat. The side panel 30 can be positioned over a portion of the back seat. The rear panel 40 can be positioned behind the back seat in front of the rear window. The divider 10 can provide a confinement area in a portion of the back seat compartment for confining a passenger therein, while leaving a remaining portion of the compartment free for use as a storage area or for use by other passengers.

Figure 2:
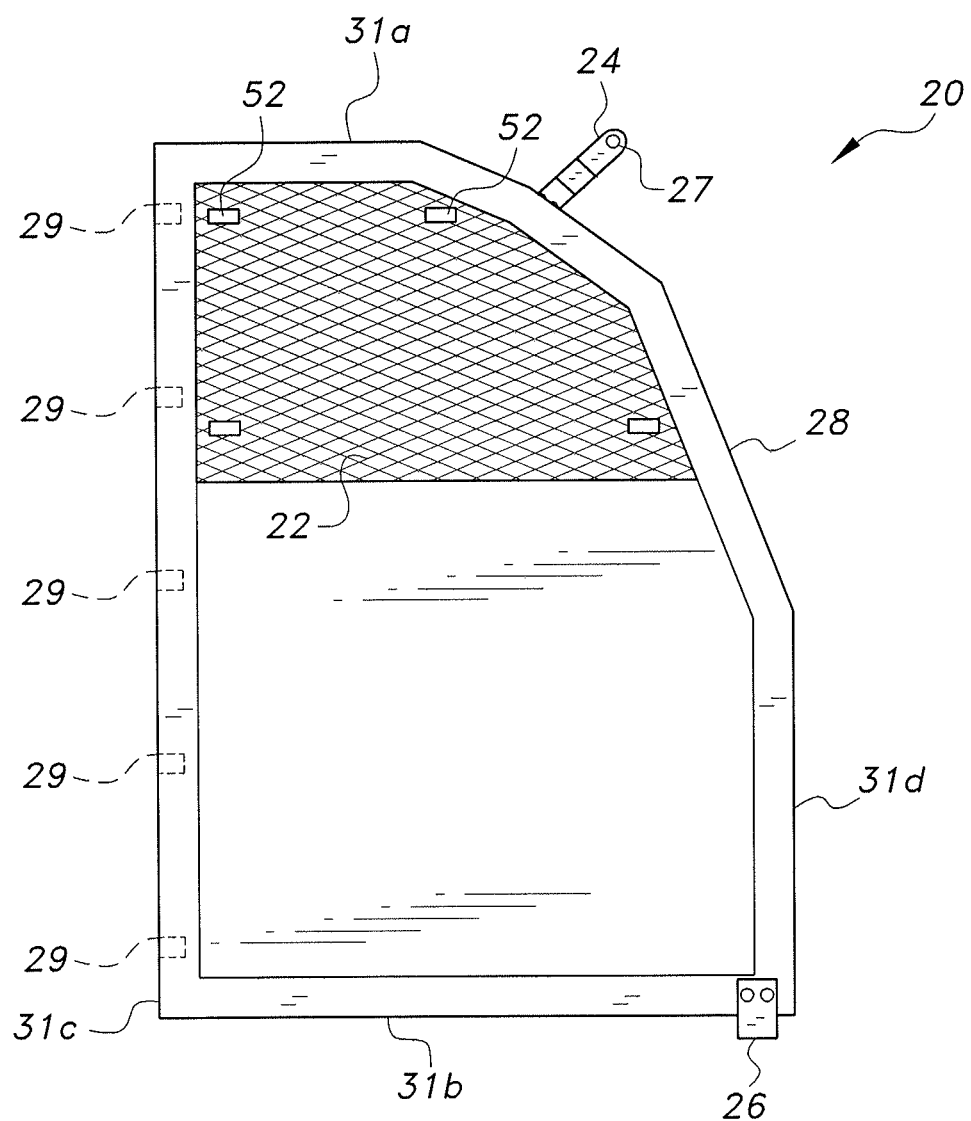
FIG. 2 is a perspective view of the front panel.

As shown in FIG. 2, the front panel 20 includes a peripheral frame 28 defined by parallel, horizontal sides 31a, 31b that extend between and connect to a straight vertical side 31c at one end and a curved or angled vertical side 31d at an opposing end. The angles or curves of the angled side 31d correspond with the angles of the ceiling and/or sidewall of the car interior to ensure that the panel 20 abuts the ceiling and/or sidewall when the security divider is properly positioned in the car.

Figure 4:
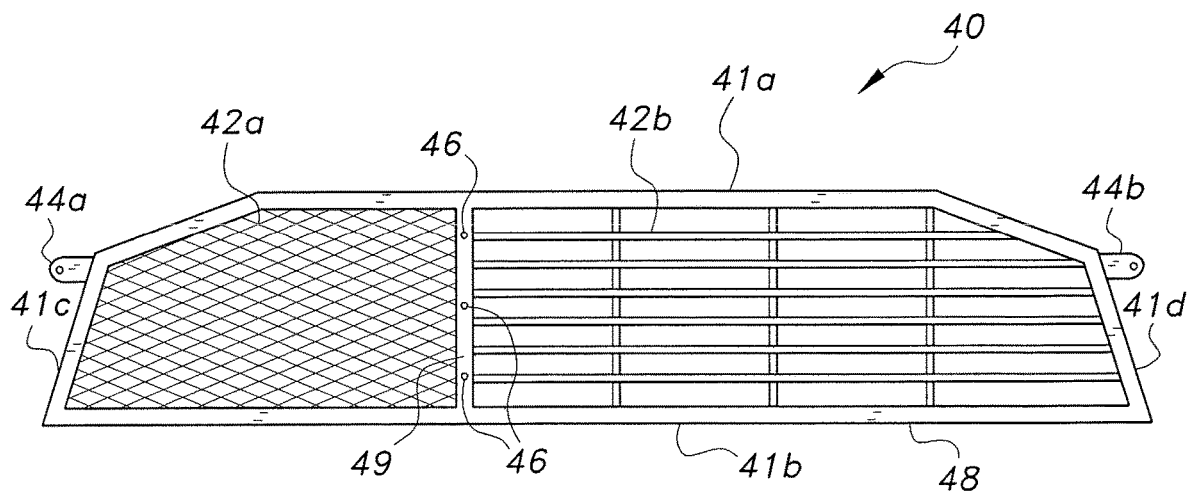
FIG. 4 is a perspective view of the rear panel.

As shown in FIG. 4, the rear panel 40 includes a peripheral frame 48 and a dividing frame member 49. The peripheral frame 48 can include a pair of horizontal sides 41a, 41b extending between and connecting a pair of angled, vertical sides 41c, 41d. The dividing frame member 49 can be spaced from sides 41c and 41d and connected to sides 41a and 41b. The rear panel 40 is configured to fit directly behind the rear seat in a space between the back seat and the ceiling of the vehicle interior.

Figure 3:
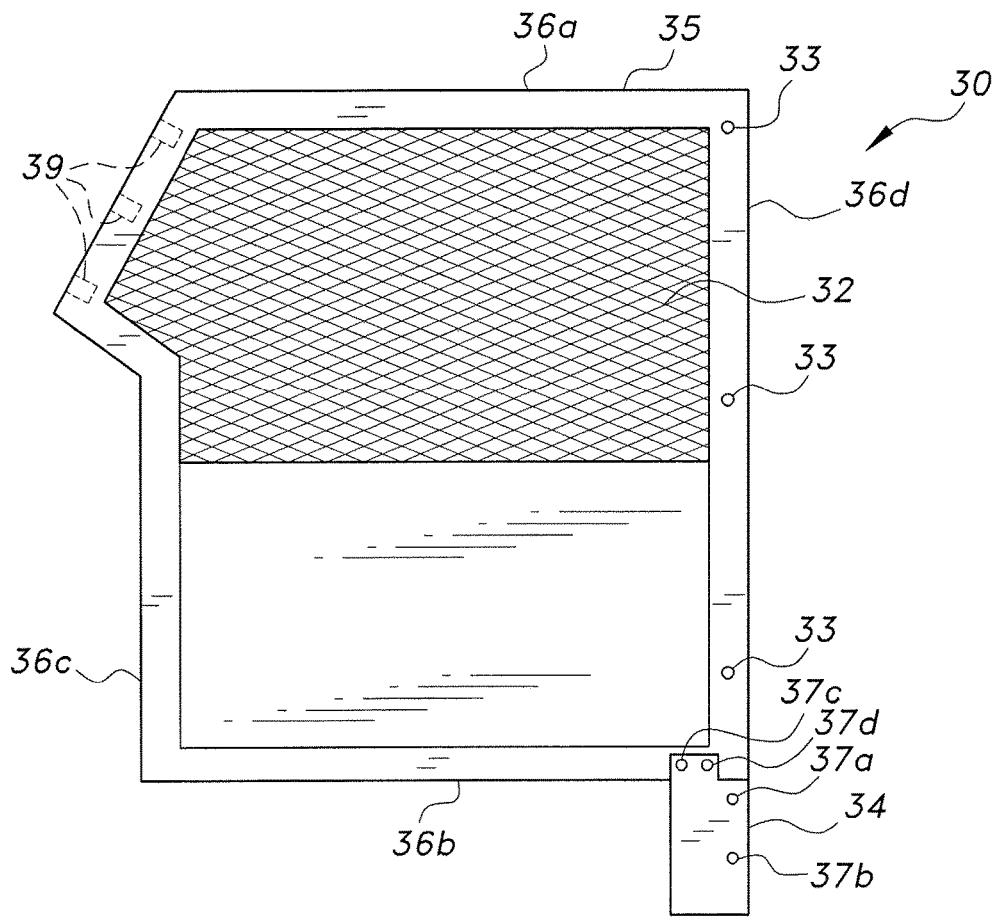
FIG. 3 is a perspective view of the side panel.

As shown in FIG. 3, the side panel 30 includes a peripheral frame 35 similar to the front panel 20. The peripheral frame 35 includes a pair of parallel, horizontal sides 36a, 36b that extend between and connect to a straight vertical side 36d at one end and an angled or curved vertical side 36c at another end. The angle or curved portion of side 36c preferably corresponds to the curve or angle at the top edge of the back seat. The angled side 36c is connected to the dividing member of the rear panel. The straight side 36d is connected to the vertical side 31c of the front panel peripheral frame 28.

According to an embodiment, side 36d of the side panel 30 can include threaded holes 33 that can be aligned with threaded holes 29 of the front panel 20 so that bolts can be inserted therethrough for securing the two panels together. Side 36c of the side panel 30 can include threaded holes 39 that can be aligned with holes 46 of the dividing member 49 of the rear panel so that bolts can be inserted therethrough for securing the two panels together. Alternatively, the front panel 20, the rear panel 40, and the side panel 30 may be connected via other methods known in the art, e.g., right angle brackets.

The peripheral frames 28, 35, and 48 may be made out of any rigid, durable material, including e.g., metal tubing, steel bars, or reinforced polymer tubing. The front panel 20 may include padding, e.g., on the surface facing the front seat passenger. The padding may provide comfort to the front passenger and help to fill gaps between the frame and the interior of the vehicle.

The front panel 20 can further include a passenger confinement window 22, an upper securement bracket 24, and a lower securement bracket 26. The passenger confinement window 22 can be formed from caging, bars, polycarbonate, heavy gauge metal screen, or other suitable material that cannot be broken by a contained passenger. With regard to caging and bars, spaces between the structural portions can be minimal to ensure safety of the front seat passenger, but allow an observer outside the containment area to view the contained passenger. In the embodiment depicted in FIGS. 1-5, the window 22 is disposed in an upper portion of the panel. In alternative embodiments, the window 22 may be designed to extend a length of the panel. In some embodiments, the window may only take up a small portion of the panel, and other embodiments may not include a window. The portion of the panel that is not a window may be a solid barrier and formed from a suitable rigid material, e.g., a metal or polymer sheet.

The side panel 30 can include a passenger confinement window 32 and a footwell panel 34. In the embodiment shown in FIGS. 1-5, the window 32 defines an upper portion of the panel, leaving a solid, lower portion. In alternate embodiments, the window may define most of the panel 30 except for the peripheral frame 35. The side panel window 32 can be formed from the same material as the front panel window 22. Similar to the front panel window 22, the side panel window 32 may have any suitable size or shape, and extends from the ceiling of the vehicle to the rear passenger seat, or to the floor when the seats are bucket seats. Alternatively, the side panel 30 may be configured without a window. The footwell panel 34 is configured to extend into the footwell of the vehicle and rest on the vehicle floor. The footwell panel 34 may be attached to the frame 36 of the side panel 30 and the frame 28 of the front panel 20 by bolts. The footwell panel 34 may include a bracket for attaching to the rear, inside bolt of the passenger side, front seat.

The rear panel 40 includes a passenger confinement window 42a, a barrier 42b, and two side securement brackets 44a, 44b for anchoring the rear panel 40 to the vehicle. Only a portion of the rear panel 40 is used for passenger confinement. As such, only the passenger confinement window 42a can be formed from materials resistant to breakage, as discussed above. The barrier 42b of the rear panel 40 can be formed from any suitable material. The dividing frame member 49 can separate the passenger confinement window 42a from the barrier 42b.

As shown in FIG. 2, the upper securement bracket 24 and lower securement bracket 26 of the front panel 20 are designed to anchor to anchoring points already present in the vehicle, thus obviating the need to modify the car. For example, the upper securement bracket 24 may be designed for connecting to the front passenger upper seatbelt bolt and the lower securement bracket 26 may be designed for connecting to the rear, outer seat bolt of the passenger seat. Similarly, brackets of the rear panel 44a, 44b include holes 44a, 44b for receiving anchor points already available in the vehicle, such as the rear passenger upper seatbelt bolts. The rear brackets as well as other brackets described herein may be adjustable to facilitate installation on different vehicles having anchor points at different locations.

The brackets in the embodiment shown in FIGS. 1-5 include holes for receiving the anchoring bolts. Alternatively, it is contemplated that clamps, hooks, adjustable loops, or secondary U-shaped components may also be used for attaching the brackets to the vehicle anchoring points. In some embodiments, the brackets may be adjustable to fit different vehicles. For example, the brackets may comprise two plates, each having an elongate aperture for receiving the bolt. The two plates can adjustably engage the bolt and allow the plates to pivot with relation to each other by movement of the bolt in the aperture. Once the bracket is set to a desired position, the bolt can be tightened to lock the plates in the set orientation. Further, each bracket may include a rotating pivot, allowing the bracket to accept anchors extending at all angles. In other non-limiting embodiments, the brackets may be interchangeable with other brackets that are specifically designed for different vehicles. A bolt may be used to connect and disconnect the interchangeable brackets to the respective panel.

Figure 5:
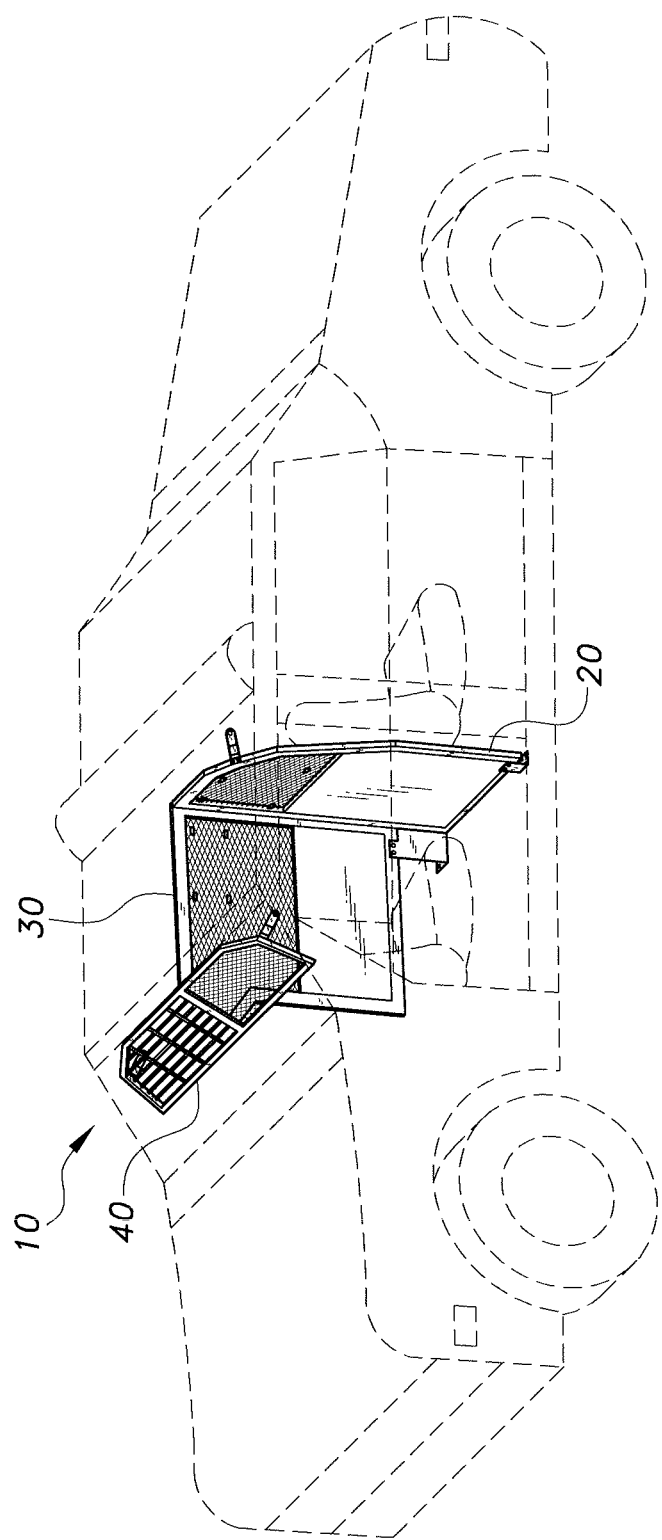
FIG. 5 is an environmental, perspective view of the vehicle security divider installed in a vehicle.

FIG. 5 depicts the vehicle security divider 10 installed in a vehicle. Although FIG. 5 shows the vehicle security divider installed in a sedan, it will be understood that the divider may be installed in other vehicle models, such as a sports utility vehicle (SUV) where the rear panel 40 may be particularly useful as a rear cargo barrier installed directly behind the rear passenger seat, preventing the confined rear passenger from accessing a cargo area behind the rear seat, which may be used for storage of rifles or other firearms, K-9s, or other hazardous cargo. As shown in FIG. 5, the divider 10 confines a passenger to a portion of the backseat, leaving a remainder of the backseat available for storage or other passengers. The divider prevents the confined passenger from moving outside of the confinement area. The front panel 20 is positioned immediately behind the front seat to give the confined passenger a maximum amount of leg room. The side panel 30 is perpendicular to the front panel, resulting in a confinement area that is roughly the same width as the front passenger seat. The rear panel 40 creates a rear confinement barrier preventing the passenger from entering a rear area of the vehicle or breaking the rear window.

Different embodiments of the vehicle security divider 10 may be used for different vehicles and different situations. For example, some embodiments may have a rear panel that only extends to the side panel in the confinement area. In another embodiment, the side panel may extend to the floor of the vehicle, obviating the need for a footwell panel. Such an embodiment may be useful for cars that have a gap between rear seats.

It is contemplated that the side panel 30 may include racks or shelves for storing equipment on a surface of the divider facing away from the confinement area. Anchor points may be added to the confinement surface of the panels for anchoring restraints attached to the confined passenger. The window portions of the panels may include supplemental brackets 52 for securing non-transparent covers to the windows.

It is also contemplated that the brackets can be movable to different portions of the panel frames for attaching to vehicles with different attachment points. The frames may include multiple sets of holes around their perimeter, allowing the securement brackets to be bolted on or otherwise attached to different locations.

In some embodiments, the panels may have adjustable dimensions to fit different sized vehicles. For example, each panel may include two separate sub-panels that are slidably connected to one another. The slidable relation may be achieved by a track or rail system. Accordingly, when the two subpanels are significantly overlapped, the adjustable dimension will be at its smallest, and when the overlap is minimized the adjustment dimension will be at its largest. For example, with regard to the side panel, the adjustment dimension may be its front-to-back length. Therefore, the adjustable panel will be capable of accommodating vehicles with different sized back seats. Each panel may be designed to have an adjustable dimension resulting in a universal device that can be manipulated to fit many different vehicles. It is further contemplated that the adjustable portion may be locked in place at a desired position by a locking mechanism such as an interference screw or other mechanism known in the art to lock components in a position on a rail.

It is further contemplated that all bolts or securing mechanisms are located outside of the intended confinement area. This will prevent a confined passenger from disassembling the panels. In situations where the adjustable portion of the bolts or securing mechanisms is located within the confinement area, safety covers may be used.

The depicted embodiment shows the confinement area on the right side of the vehicle, since it is configured for a left hand drive vehicle. This is because the confinement area is designed to be located behind the passenger seat. In a right hand drive vehicle, the confinement area would be located on the left side of the vehicle.

It is to be understood that the vehicle security divider is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A vehicle security divider, comprising:
    an elongated front panel including a peripheral frame, a barrier material filling the peripheral frame, and at least one mounting bracket connected to the peripheral frame;
    an elongated side panel including a peripheral frame connected to the peripheral frame of the front panel at adjoining lateral ends of the front and side panels, the side panel extending normal to the front panel, the side panel including a barrier material filling the peripheral frame; and
    an elongated rear panel including a peripheral frame, a barrier material filling the peripheral frame, at least one mounting bracket connected to the peripheral frame, and a dividing member, the dividing member being disposed between and parallel to opposing lateral ends of the rear panel, the side panel being connected to the dividing member, the rear panel extending normal to the side panel;
    wherein the panels define a rear passenger confinement area adapted for installation in a motor vehicle with the front panel mounted directly behind a front passenger seat, the side panel dividing a rear passenger compartment, and the rear panel mounted directly behind a rear passenger seat to provide barriers preventing a rear passenger from reaching forward into a front seat area, laterally into an adjacent rear passenger area, or rearward into a rear cargo storage area behind the rear passenger seat of the vehicle.

2. The vehicle security divider of claim 1, wherein at least one of the front panel, the side panel, and the rear panel includes a confinement window mounted within the peripheral frame, the confinement window being a heavy gauge metal screen.

3. The vehicle security divider of claim 1, wherein the at least one mounting bracket of the front panel includes an upper front mounting bracket attached to the peripheral frame, the upper front mounting bracket being adapted for attachment to the motor vehicle.

4. The vehicle security divider of claim 3, wherein the at least one mounting bracket of the front panel further includes a lower front mounting bracket attached to the peripheral frame of the front panel, the lower front mounting bracket being adapted for attachment to the motor vehicle.

5. The vehicle security divider according to claim 4, wherein the at least one mounting bracket of the rear panel further includes a passenger side bracket and a driver side bracket extending from opposite ends of the rear panel.

6. The vehicle security divider according to claim 1, wherein the front panel, side panel, and back panel each include confinement windows mounted within their respective peripheral frames.

7. The vehicle security divider according to claim 1, further comprising a footwell panel rigidly attached to a lower edge of the side panel.

8. The vehicle security divider according to claim 1, wherein said barrier material comprises a sheet of metal.

9. The vehicle security divider according to claim 8, wherein said barrier material further comprises a heavy gauge metal screen confinement window disposed within the sheet of metal.

10. A vehicle security divider in combination with a vehicle having front and rear passenger areas, front and rear passenger seats mounted within the front and rear passenger areas, a floor, a ceiling, opposing side wall surfaces, opposing car doors, and a rear cargo storage area behind the rear passenger area, the vehicle security divider comprising:
    an elongated front panel including a peripheral frame, a barrier material filling the peripheral frame, and at least one mounting bracket connected to the peripheral frame, the front panel being mounted to the vehicle behind the front passenger seat and extending from the vehicle ceiling to the floor of the vehicle;
    an elongated side panel including a peripheral frame connected to the peripheral frame of the front panel at adjoining lateral ends of the front and side panels, the side panel extending normal to the front panel, the side panel including a barrier material filling the peripheral frame, the side panel extending from the vehicle ceiling to at least the rear passenger seat, the side panel dividing the rear passenger area into a confined passenger area and an unconfined passenger area; and
    an elongated rear panel including a peripheral frame, a barrier material filling the peripheral frame, at least one mounting bracket connected to the peripheral frame, and a dividing member, the dividing member being disposed between and parallel to opposing ends of the rear panel, the side panel being connected to the dividing member, the rear panel extending normal to the side panel, the rear panel being mounted directly behind the rear passenger seats between opposing side surfaces of the vehicle and extending from the vehicle ceiling;
    wherein the panels define a rear passenger confinement area to provide barriers preventing a rear passenger from reaching forward into the front seat area, laterally into an adjacent rear passenger area, or rearward into the rear cargo storage area behind the rear passenger seats of the vehicle.

11. The combination according to claim 10, wherein said barrier material comprises a sheet of metal.

12. The combination according to claim 11, wherein said barrier material further comprises a heavy gauge metal screen confinement window disposed within the sheet of metal.

* * * * *